Feb. 7, 1939.    R. CHILTON    2,146,528
ROTARY VALVE
Filed July 31, 1935    3 Sheets-Sheet 1

INVENTOR.
ROLAND CHILTON
BY
ATTORNEY.

Feb. 7, 1939. R. CHILTON 2,146,528
ROTARY VALVE
Filed July 31, 1935  3 Sheets-Sheet 3
Fig. 3.
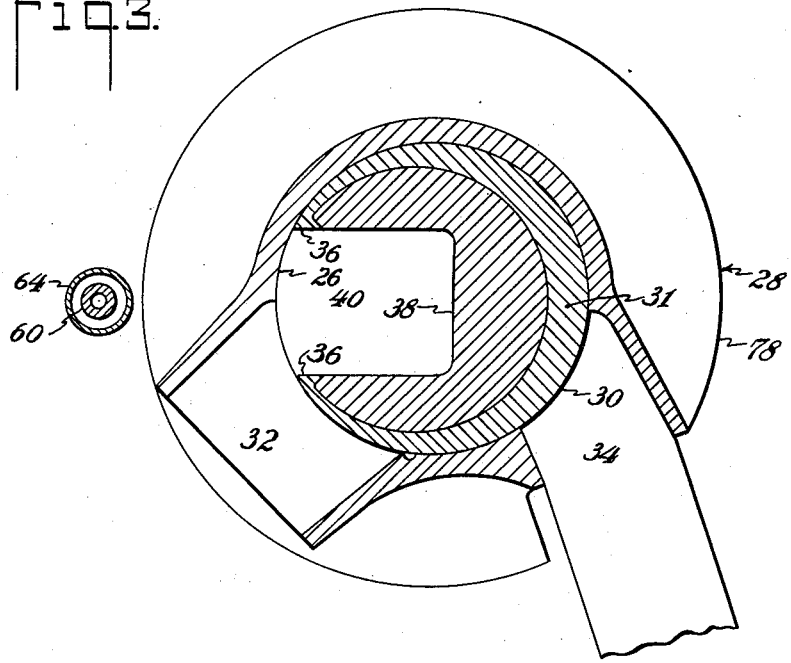
Fig. 4.
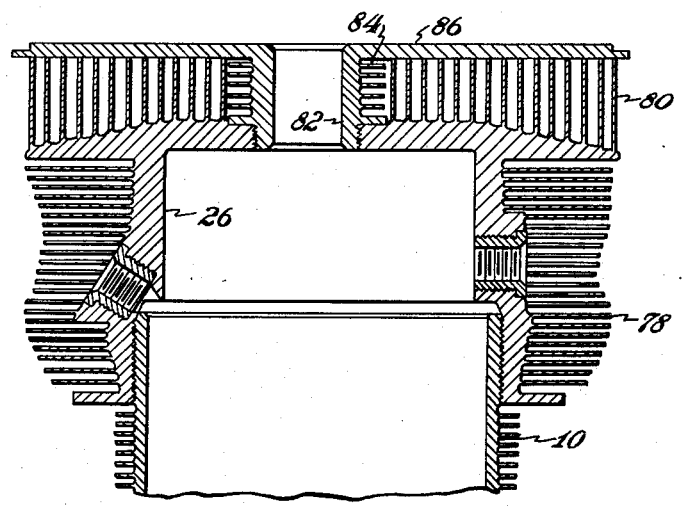
INVENTOR.
ROLAND CHILTON
BY 
ATTORNEY.

Patented Feb. 7, 1939

2,146,528

UNITED STATES PATENT OFFICE

2,146,528
ROTARY VALVE

Roland Chilton, Ridgewood, N. J., assignor, by mesne assignments, to Wright Aeronautical Corporation, Paterson, N. J., a corporation of New York Application July 31, 1935, Serial No. 33,949

2 Claims. (Cl. 251—96)

This invention relates to rotary valves in general, and the preferred embodiment of the drawings shows the invention as applied to an air-cooled radial aircraft engine.

The valve is of the cylindrical split self-sealing type and is arranged for rotation substantially coaxial to the cylinder.

Objects of the invention are to overcome the difficulty with lubrication and the tendency to wear and seizure that have been characteristic of previous attempts to utilize this simple form of valve. These difficulties have been largely due to the fact that the valve must bridge ports in the cylinder of relatively great height and width; in contra-distinction to the well-known sleeve valve wherein the ports are usually of relatively short height. In this latter case relatively thin valves have been satisfactory, but attempts to import similar proportions into the rotary valve have failed because the explosion pressures tend to distort the valve, or, in other words, to "bulge" it into the port. It will be appreciated that the valve comprises a beam across the port and is loaded internally by high explosion pressure and the natural deflections of such a beam tend to concentrate the bearing loads at the edges of the port causing excessive intensity of localized bearing pressure and a breakdown in the lubrication film.

Accordingly the present invention consists in part in the use of an abnormally thick valve whereof the stiffness is comparable to the circumferential stiffness of the cylinder itself; thus when the combined structure is subject to internal pressure the valve, and the cylinder in which it rotates, deform in sympathy, thus distributing the loads over the bearing surface.

Another difficulty experienced with these valves has been in controlling the lubricant supply. In this respect the valve is like the piston and cylinder bearing surface in that it is lubricated on a "total loss" basis. That is to say, all the oil which passes the piston and valve is subsequently ejected at the exhaust port. In the case of the piston the problem of controlling the oil quantity has been met by the development of suitable piston rings and in the case of the valve of this invention a simple metering device which positively controls the oil quantity has been built into the valve.

Another difficulty in this type of mechanism has been that, under part-throttle conditions, the vacuum in the cylinder is apt to draw in excess quantities of oil past the valve. In this invention this condition is remedied by utilizing the valve driving gears as a vacuum pump whereby excess oil is returned to the engine crankcase and sub-atmospheric pressures are maintained in the valve gear housing.

A still further object of the invention is to provide an improved and simplified valve drive gear organization especially suited for radial engines.

A further object of the invention is to provide a simplified head construction so that forged material may be used for superior strength, as compared to the usual cast heads and to provide a structure in which a large number of closely spaced and deep fins may be produced by simple machining methods.

A further and prime object is to provide a rotary valve suitable for an air-cooled engine and wherein the valve will be well protected from the heat of combustion. An associated object is to provide a structure wherein an improved path of heat flow is provided for cooling the valve and associated parts.

In the drawings:

Fig. 3 is a transverse section through the valve and ports; and

Fig. 4 is a fragmentary axial section through the cylinder head with the valve removed.

Figure 1:
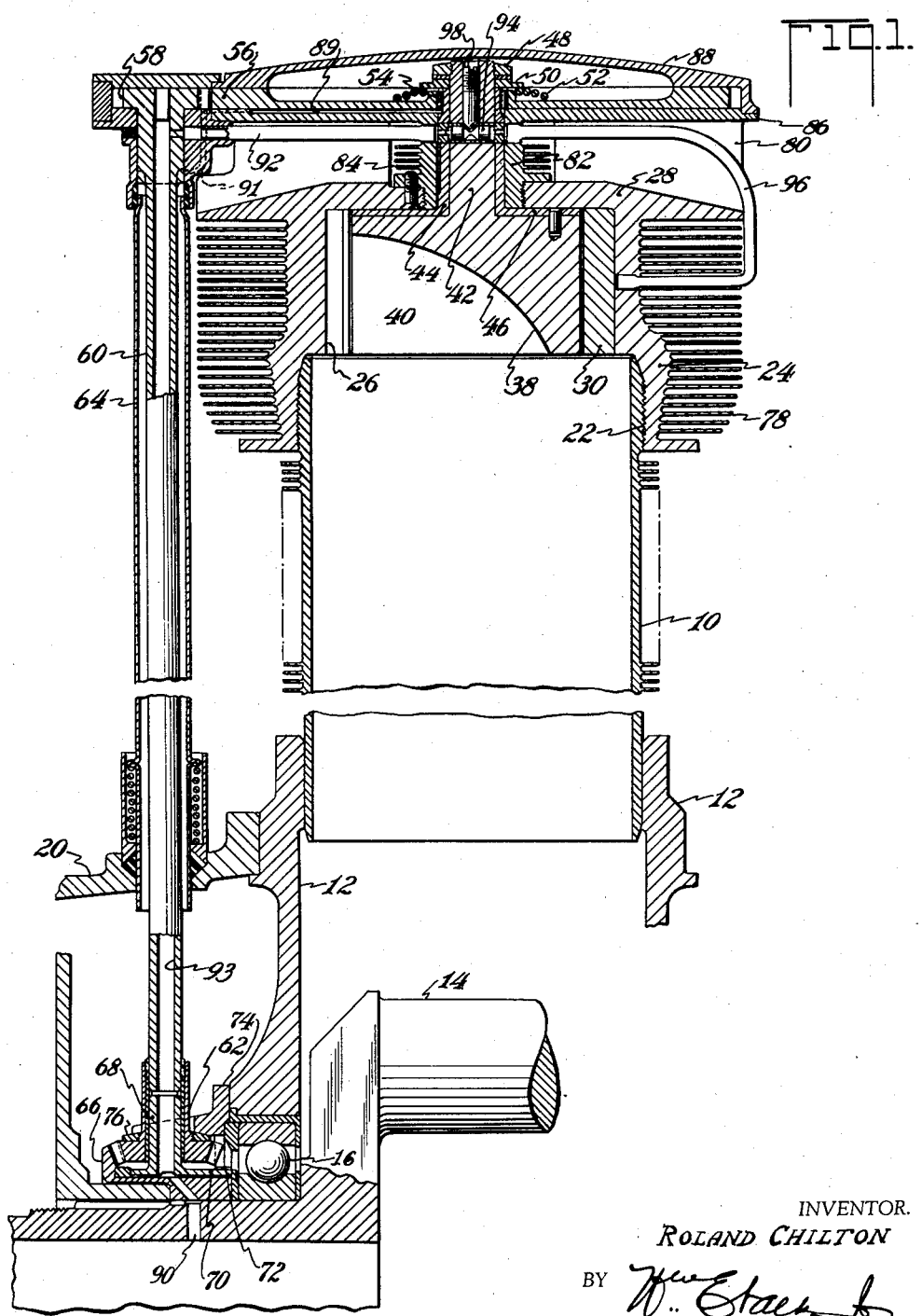
Fig. 1 is a longitudinal section through a cylinder incorporating the invention, showing the engine crankshaft in fragmentary section.
Figure 2:
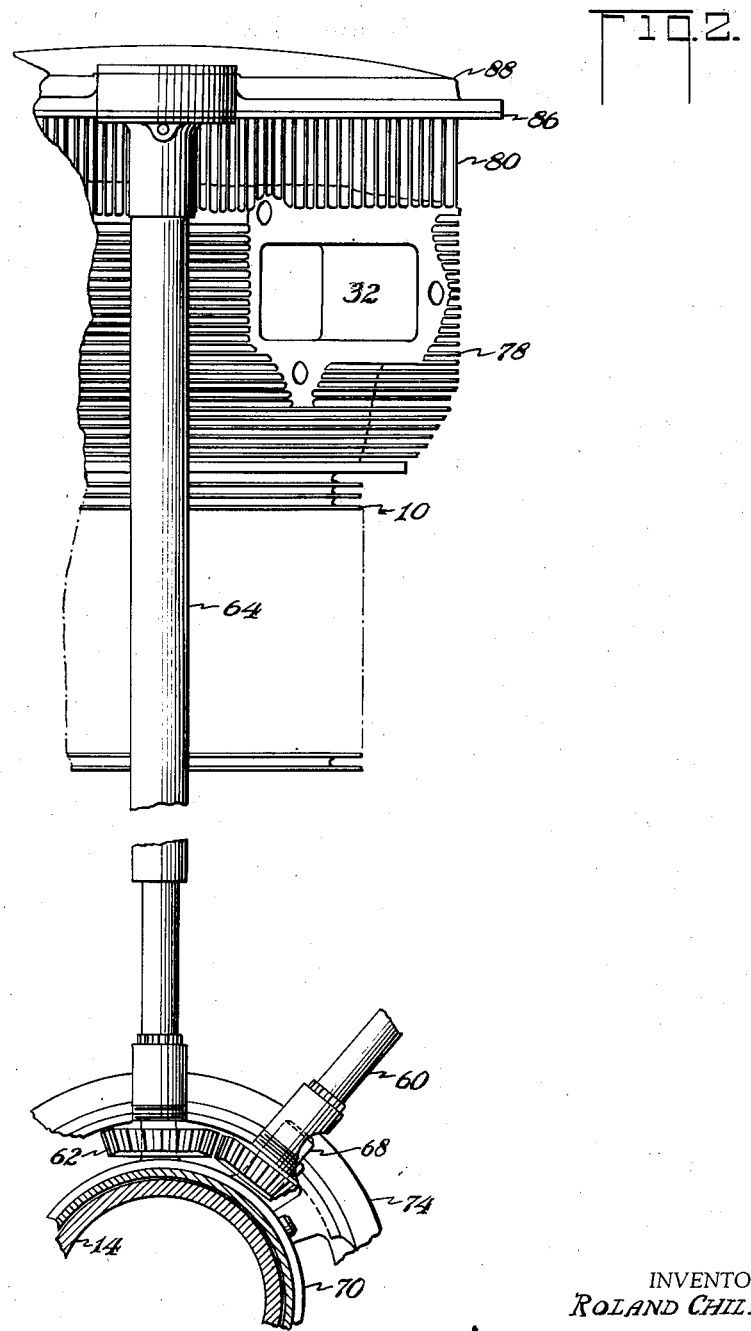
Fig. 2 is a fragmentary front view with the crankshaft shown in fragmentary section.

A conventional cylinder barrel 10 is suitably secured to a conventional crankcase 12 having the usual crankshaft 14 supported in a ball bearing 16 and equipped with a propeller driving gear shown in fragmentary section at 18. The crankcase is further equipped with a nose piece or gear housing shown in fragmentary section at 20.

Suitably secured to the top of the barrel 10, as by shrinking on screw threads 22, is a cylinder head 24 having a bore 26 of reduced diameter and closed by a head portion 28. Fitted for rotation in the bore 26 is a very thick split or cuff type valve 30. The split or opening in the valve is of the same width throughout the sleeve length and cooperates with ports 32, 34 (Fig. 3) to effect the desired timing of the valve functions in the usual way. The interior of the valve is preferably eccentric giving a tapered effect whereby that portion 31' of the valve which bridges the ports at the time of explosion is abnormally thick as compared to any previous practice, while the ends of the valve, which are not subject to explosion load except when contacting the uninterrupted part of the cylinder are of normal thinness to provide necessary resilience. At its ends the valve is provided with driving lips 36 (Fig. 3) and loosely engaged within the valve is a driving member or plug 38 which is made of high conductivity material and provided with a port 40 corresponding with the opening in the valve, the port interrupting the bottom periphery of the plug 38 so that no isolated portions project therefrom which would introduce cooling and lubricating difficulties.

The plug 38 has an integral shaft extension 42 surrounded by a sleeve 44 having an integral plate 46 secured in good thermal contact with the top of the driving plug 38 by means of a nut 48 which also secures a washer 50 with which is engaged a spring 52 by means of which the bearing plate 46 is kept lightly in contact with the bearing surface of the head 28. Splined to the sleeve 44 at 54 is a large gear 56 engaged with a pinion 58 on a vertical driveshaft 60 which is splined at its lower end into a bevel pinion 62. The vertical driveshaft 60 is equipped with an oil tight tubular housing 64.

Organized for rotation with the crankshaft 14 is a bevel gear 66 engaging the bevel pinion 62. It will be understood that there will be one vertical driveshaft and bevel pinion 62 for each cylinder. The latter pinions are supported on a spider having radially extending journals 68 and a sleeve 70 mounted on the hub of the gear 66 and restrained from rotation by a spline connection 72 with a bracket 74 suitably secured to the crankcase 12. Between the pinions 62 and the bracket 74 there are inserted spherically seated thrust washers 76.

The head is provided with circumferential cooling fins 78 and transverse upper fins 80 and it is a feature of the construction that these fins may be formed in a head of forged material by relatively simple machining operations in conformity with one of the objects of the invention.

Secured into the head portion 28 is a bushing 82 equipped with cooling fins 84 and integral with this bushing is a base plate 86 (Figs. 1 and 4) to which is secured a gear cover 88. These parts comprise an oil and air-tight housing for the gears 56 and 58.

The gear housing 86, 88 and the gears 58, 56 are organized to comprise a vacuum pump by which any oil which leaks from the valve driving shaft 44 and bushing 82 is drawn to the unmeshing teeth of the gears 56, 58, through a passage 89, whence oil is carried around the gears between the teeth thereof, to be delivered by a duct shown in dotted lines, diagrammatically at 91, to the shaft housing 64 for return to the engine crankcase.

The crankshaft 14 contains oil under pressure in the usual way and this oil is fed through a hole 90 to each journal of the spider 70 and up the associated vertical driveshaft to a pipe 92, the pipe connecting through the hollow 93 of the shaft to the bearing 82.

Disposed diametrically across the valve shaft 42 opposite this lubrication pressure pipe 92 is a circumferentially grooved floating metering pin 94 and diametrically opposite to the pipe 92 in the bearing 82 a rotary valve lubrication pipe 96 is provided as shown.

It will be seen that twice per revolution of the valve one end of the floating metering pin 94 is presented to the pressure pipe 92 whereby the pin will be moved over to the right and the small space at the end of the pin will become filled with oil. At the same time the previously filled space at the other end of the pin is now opposite to the valve lubrication pipe 96 and the small quantity of lubricant previously entrained therein will be delivered to the pipe. The stroke of the pin and therefore the quantity of oil delivered at each half revolution is adjustable through a conical-ended screw 98 engaging the circumferential groove of the pin 94.

The valving functions are as in conventional cuff type rotary valves and need no further description. It is emphasized, however, that the abnormal thickness of the valve 30 whereby its stiffness against local bending approximates that of the cylinder is the essence of the present invention. It should be clear that when internal pressure is applied to a split valve seated in a cylindrical wall interrupted by ports there will be some distortion of the valve and if the cylinder is much more rigid than the valve there will be less distortion of the cylinder which will concentrate the explosion load immediately adjacent to the port periphery. On the other hand, if the circumferential stiffness of the valve is as great as that of the cylinder on which it seats, as in this invention, the two parts will distort in consonance, maintaining a favorable pressure distribution and avoiding a breakdown in the film lubrication condition as is essential for minimizing friction and wear between loaded sliding surfaces.

Further features of the invention reside in the driving plug 38. It will be seen that this relatively solid member has a large surface of thermal contact with the head 28 providing an adequate path of heat flow to the upper cooling fins 80. This plug also serves to protect the inner surface of the valve 30 from heat flow so that the valve is virtually surrounded by cooled metal. Neither the plug nor the sleeve carry any redundant projections subject to high temperatures of combustion which in the structures of the prior art have introduced cooling difficulties.

It will be seen that this valve by virtue of its tapered segmental shape, is of the simple self-sealing type wherein the internal pressures keep the valve seated against leakage as in the steam engine slide valve. It is contemplated that the dimensions will be such that the valve will have a slight initial expansion giving some initial sealing contact pressure when assembled in the cylinder but, due to the abnormal thickness of the valve, the excess diameter thereof in its free condition will be very much less than usual.

It will also be noted that the valve is driven from the plug 38 exclusively by the lips 36 which give the valve an "unwrapping" action in either direction of rotation, thus, should any tendency to seize develop, the valve will be automatically contracted or "unwrapped" from within the cylinder thus relieving any temporary tightness.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. A rotary valve structure comprising a split sleeve of cylindrical form, the split in said sleeve being of a width such as to provide a valve opening and being of the same width throughout the sleeve length, the sleeve edges comprising driving lips therefor coextensive in length with the sleeve, and a cylindrical plug within said sleeve having a passage formed therein extending from the bottom to the side face thereof and interrupting the plug edge, said sleeve lips engaging said plug adjacent the side opening therein.

2. The combination in rotary valve engine structure, of a valve cylinder having a port, the cylinder being closed at the top to form a head and being opened at the bottom to an engine cylinder, a split sleeve valve engaging and co-extensive in length with the valve cylinder, the edges of the sleeve at said split being cylindrical elements co-extensive in length with the sleeve and defining a space therebetween substantially equal to the width of said port, and a rotary driving plug within and drivably engaging said sleeve, said driving plug covering the entire inner surface of said sleeve and bearing in close thermal relationship upon the closed valve cylinder head, said plug having a smooth duct interrupting its base periphery, extending from the plug base laterally to the split in said sleeve, said duct being substantially co-extensive in height and width with the valve cylinder port and with the space defined between the sleeve edges and the top and bottom of the sleeve, whereby gas flow through the sleeve valve and plug is substantially uninterrupted due to lack of protuberances in said duct.

ROLAND CHILTON.